Aug. 18, 1953  J. E. GIAMBIASI  2,648,911
GAUGE
Filed Nov. 29, 1951  2 Sheets-Sheet 1
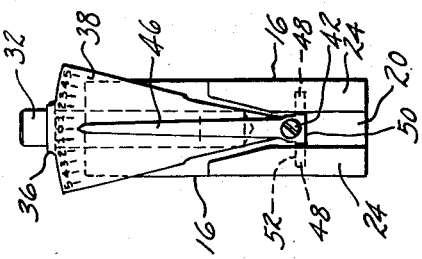
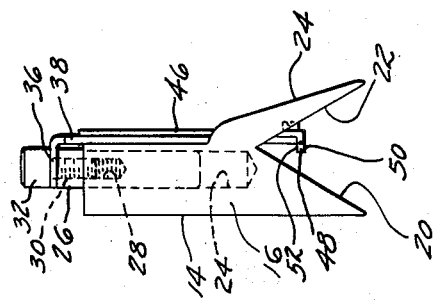
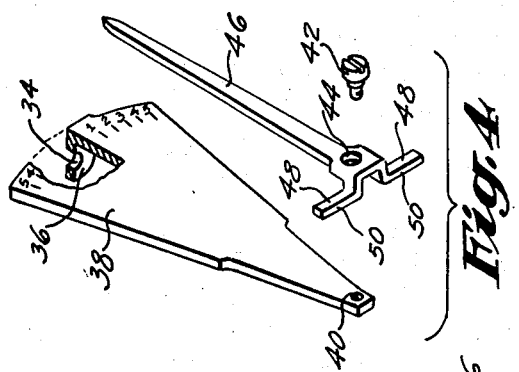
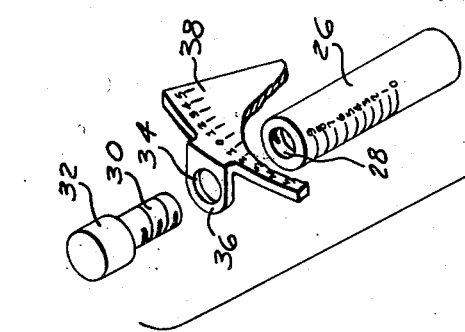
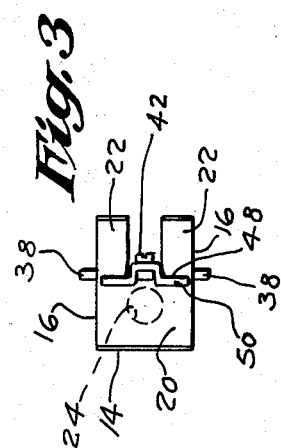
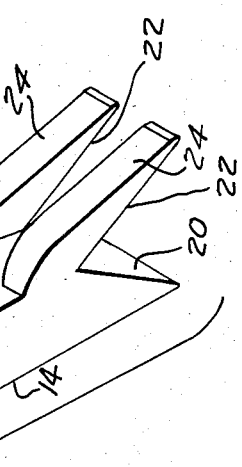
INVENTOR.
John E. Giambiasi
BY
Louis Necho
Attorney Aug. 18, 1953  J. E. GIAMBIASI  2,648,911
GAUGE
Filed Nov. 29, 1951  2 Sheets-Sheet 2
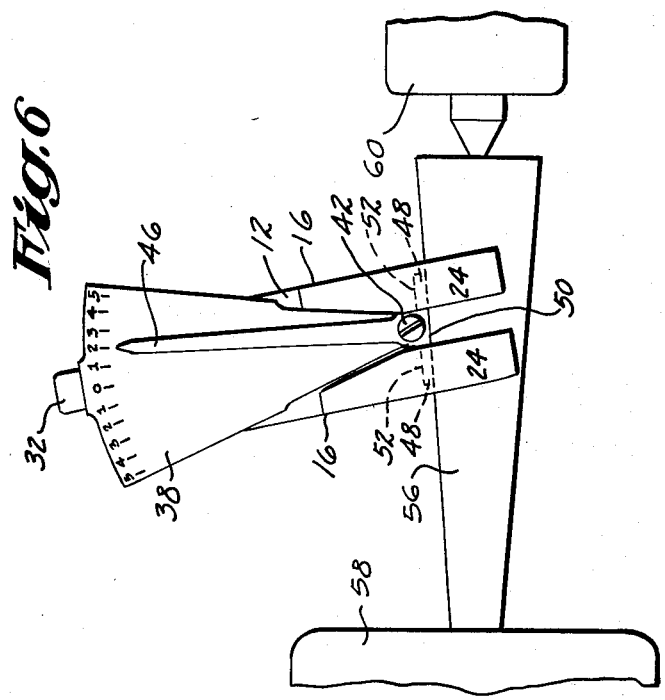
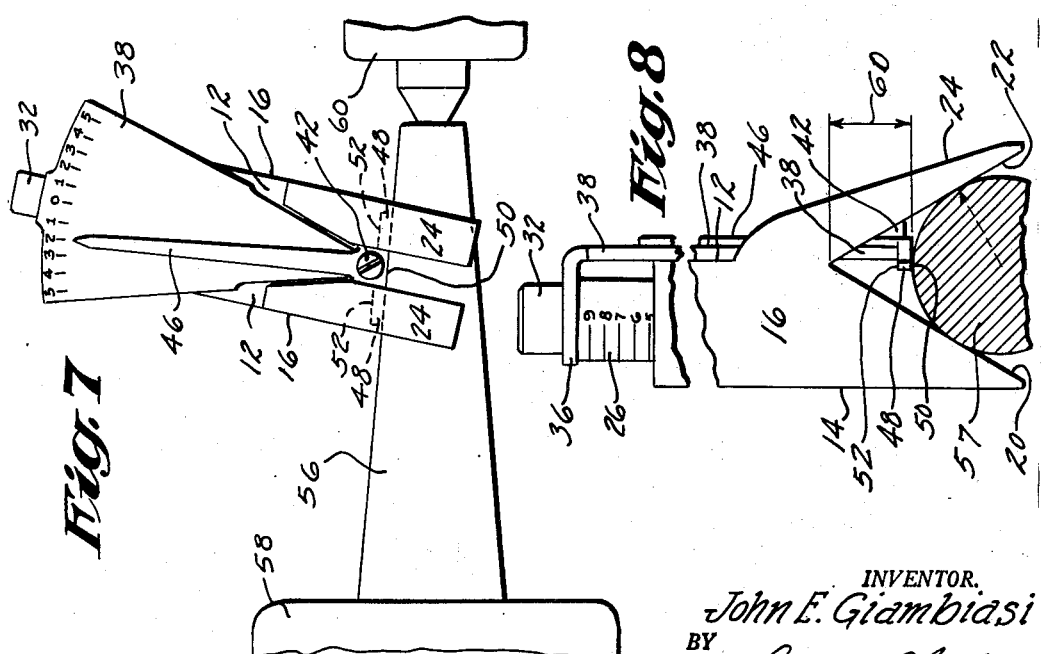
INVENTOR.
John E. Giambiasi
BY
Louis Vecho
Attorney Patented Aug. 18, 1953

2,648,911

UNITED STATES PATENT OFFICE 2,648,911

GAUGE

John E. Giambiasi, Philadelphia, Pa.

Application November 29, 1951, Serial No. 258,845

5 Claims. (Cl. 33—174)

My invention relates to a gauge of the type used for ascertaining the uniformity and accuracy of a cylindrical body by measuring any taper or other inclination which may be present in such body, and for measuring the diameter of a cylindrical or spherical object.

One object of the invention is to produce an improved gauge of the type set forth.

A further object is to produce an improved gauge of the type referred to which will be accurate, relatively inexpensive to make and easy to use.

These and other objects are attained by my invention as set forth in the following specification and the accompanying drawings in which:

Fig. 1 is a front elevational view of a gauge embodying my invention.

Fig. 2 is a side elevational view of the same.

Fig. 3 is a bottom plan view of the same.

Fig. 4 is a perspective view of some of the parts of the gauge.

Fig. 5 is an exploded perspective view showing the manner in which the gauge is assembled.

Figs. 6 and 7 are enlarged front elevational views, similar to Fig. 1, but illustrating the use of the gauge for measuring the taper of a conical body.

Fig. 8 is an enlarged side elevational view similar to Fig. 2 but illustrating the use of the gauge for measuring the diameter of a round or cylindrical object.

As best shown in Figs. 4 and 5, the gauge of my invention includes a body 10 which has parallel front and rear walls 12 and 14 and parallel sides 16. The top wall 18 is flat and is normal to the front, rear and side walls. The bottom end of the gauge is in the form of an inverted V, one limb of which is formed of a continuous surface 20 and the other limb of which is formed by the inner surfaces 22 of spaced legs 24. The surfaces 20 and 22 are flat and converge to form an angle the apex of which lies in a plane parallel to the plane of front wall 12.

The body 10 is provided with an opening 25 in which is freely reciprocable a cylindrical member 26. The cylindrical member 26 is provided with a threaded opening 28 for engagement with a screw 30. The shank of the screw is adapted freely to pass through an opening 34 formed in a flange 36 carried by the upper end of an index plate 38 to integrate the index plate with cylindrical member 26. The index plate 38 tapers downwardly and its lower, reduced end is provided with tapped opening 40 for engagement with a screw 42 which is adapted to pass freely through an opening 44 formed in the lower portion of a pointer 46, pivotally to mount pointer 46 onto index plate 38. The lower portion of pointer 46 is provided with rearwardly offset arms 48 the lower surfaces 50 of which are flat and lie in a plane parallel to the plane of the upper edges 52 of the arms 48.

The gauge is assembled as follows: The pointer 46 is pivotally secured to the lower end of index plate 38 by means of screw 42. The index plate 38 is now turned on its edge and the lower reduced portion thereof is inserted between the legs 24 at some point below the junction of the legs with the body of the gauge. The index plate is then turned to the position thereof shown in Figs. 1 and 2 in which it lies flat against front wall 12. The screw 30 is next passed through opening 34 and is threaded tightly into tapped hole 28. By this arrangement index plate 38 and the pointer 46 carried thereby are secured against falling out and are movable relative to the body of the gauge with cylindrical member 26.

To use the gauge for measuring the uniformity of a cylindrical body or the taper of a conical body 56 held between the chuck 58 and the tail stock 60 of a lathe, or the like, the gauge is presented to the body 56 in the manner shown in Figs. 6 and 7 and is pressed down firmly until there is solid and continuous contact between the surfaces 20 and 22 and the surface of the body 56. Because the thinner portion of the body 56 will move further up toward the apex of the angle than the thicker portion thereof, the arms 48 will assume the inclined position shown in Figs. 6 and 7 and the pointer 46 will move to the right or to the left of zero on plate 38 according to the direction of the taper of the body 56. If the surface of the rod 56 is truly cylindrical, the pointer 46 will point to zero on index plate 38. By proper calibration, the figure to which the pointer will move will constitute a measure of the taper of the surface measured.

The device illustrated is capable of gauging a rod having a diameter of about one inch or less but it is obvious that by increasing the width of the inverted V, the gauge can be used on larger diameters. In Figs. 6 and 7 the rod to be gauged is shown fixed in a lathe or the like, and the gauge is applied to the rod. Alternatively, the gauge can be held fixed and the rod to be gauged can be presented to it. Likewise, the gauge can be moved along the rod 56 so as to furnish a running record or it can be applied to selected spots on the surface of the rod. Also, by turning the rod, without relative longitudinal movement between the rod and the gauge, the concentricity of the rod can be ascertained. In all cases, it is merely necessary that the rod have complete contact with surfaces 20 and 22 and that the lower edges 50 of arms 48 have complete contact with the surface of the rod.

To use the gauge to measure the diameter of a round rod 57, the stem 26 is suitably calibrated in terms of the desired unit of measurement so that, when the gauge is applied to the rod, as shown in Fig. 8, the reading on the stem 26 will indicate the diameter of rod 57 in terms of the unit of measurement selected for this purpose.

What I claim is:

1. A gauge including an elongated, generally vertical body having a V formed at one end thereof, there being a through hole in said body leading from the apex of the V to the other end of said body, a calibrated rod movable in said hole, an index plate secured to the upper portion of, and movable with said rod, a feeler normal to the axis of said rod and pivoted to the lower end of said rod and movable in said V with the movement of said rod in said hole, and a pointer carried by said feeler and movable relative to the surface of said index plate upon contact of said feeler with a surface which is not normal to the axis of said rod.

2. A gauge including an elongated, generally vertical body, a wall structure defining an inverted V at the lower end of said body, an index plate, means for slidably securing said index plate to said body with the lower end of said plate projecting into said V, a pointer having the lower end thereof pivoted to the lower end of said plate with the upper end thereof movable relative to indicia on the upper portion of said plate, and a cross arm carried by the pivoted lower end of, and normal to the axis of, said pointer, said pointer and said cross arm, said pointer and said index plate being so arranged and related that, when said arm abuts a surface which is normal to the axis of said pointer, said pointer assumes a vertical position with reference to said index plate, and whereby, when said cross arm abuts a surface which is not normal to the axis of said pointer, said pointer will move accordingly with reference to said index plate.

3. The structure recited in claim 2 in which said wall structure includes two spaced legs depending from one side of said body, and a wall extension depending from the other side of said body.

4. The structure recited in claim 3 in which the portion of the index plate which projects in the inverted V is located between said legs, and said cross arm is adapted to engage the apex of said V to prevent disengagement of said index plate and said pointer from said body.

5. The structure recited in claim 2 in which said means includes a rod and means of securing said plate to said rod, there being an opening in said body in which said rod is movable, and means for limiting the movement of said rod.

JOHN E. GIAMBIASI.

References Cited in the file of this patent

UNITED STATES PATENTS

| Number | Name | Date |
|---|---|---|
| 181,809 | Williams | Sept. 5, 1876 |
| 657,136 | Schultz | Sept. 4, 1900 |
| 1,411,911 | Desbains | Apr. 4, 1922 |
| 1,536,576 | Fields | May 5, 1925 |
| 2,503,871 | Hartl | Apr. 11, 1950 |

FOREIGN PATENTS

| Number | Country | Date |
|---|---|---|
| 6,055 | Great Britain | Mar. 16, 1903 |